(12) United States Patent  
Grisenthwaite

(10) Patent No.: US 8,959,318 B2  
(45) Date of Patent: Feb. 17, 2015

(54) ILLEGAL MODE CHANGE HANDLING

(75) Inventor: Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 743 days.

(21) Appl. No.: 13/067,808

(22) Filed: Jun. 28, 2011

(65) Prior Publication Data

US 2012/0042154 A1 Feb. 16, 2012

(30) Foreign Application Priority Data

Aug. 11, 2010 (GB) .................................. 1013467.4

(51) Int. Cl.
*G06F 9/30* (2006.01)
*G06F 9/38* (2006.01)

(52) U.S. Cl.
CPC ........ *G06F 9/30101* (2013.01); *G06F 9/30181* (2013.01); *G06F 9/3861* (2013.01); *G06F 9/30189* (2013.01); *G06F 9/30196* (2013.01)
USPC .......................................................... 712/229

(58) Field of Classification Search
CPC combination set(s) only.
See application file for complete search history.

(56) References Cited

U.S. PATENT DOCUMENTS

| | | | |
|---|---|---|---|
| 5,542,033 A | 7/1996 | Dao-Trong et al. | |
| 6,343,048 B1 * | 1/2002 | Jung | 365/189.16 |
| 7,281,271 B1 * | 10/2007 | Szor | 726/25 |
| 7,647,589 B1 * | 1/2010 | Dobrovolskiy et al. | 718/1 |
| 8,150,950 B2 * | 4/2012 | McQuillan et al. | 709/222 |
| 2004/0019773 A1 * | 1/2004 | Myoga et al. | 712/244 |
| 2004/0158727 A1 | 8/2004 | Watt et al. | |
| 2004/0168047 A1 * | 8/2004 | Fukai et al. | 712/229 |
| 2005/0144442 A1 * | 6/2005 | Smith | 713/164 |
| 2007/0050848 A1 * | 3/2007 | Khalid | 726/24 |
| 2007/0067826 A1 | 3/2007 | Conti | |
| 2007/0150730 A1 * | 6/2007 | Conti | 713/166 |
| 2007/0180524 A1 * | 8/2007 | Choi et al. | 726/23 |
| 2007/0260838 A1 | 11/2007 | Schwemmlein | |
| 2008/0120499 A1 | 5/2008 | Zimmer et al. | |
| 2008/0244137 A1 | 10/2008 | Kranich | |
| 2008/0244229 A1 * | 10/2008 | Yao et al. | 712/205 |

(Continued)

FOREIGN PATENT DOCUMENTS

| | | |
|---|---|---|
| CN | 1525323 | 9/2004 |
| EP | 0 649 091 | 4/1995 |

(Continued)

OTHER PUBLICATIONS

International Search Report and Written Opinion of the International Searching Authority mailed Sep. 9, 2011 in PCT/GB2011/051095.

(Continued)

*Primary Examiner* — Eric Coleman
(74) *Attorney, Agent, or Firm* — Nixon & Vanderhye P.C.

(57) ABSTRACT

A data processing system 2 supporting multiple modes of operation is provided with illegal change detecting circuitry 22 which detects attempts by program instructions to perform an illegal change of mode, such as a change to a higher level of privilege in response to execution of a mode changing program instruction or an exception return instruction. If such a change is detected, then an illegal change bit CPSR.IL is set. An instruction decoder 12 is responsive to the illegal change bit having a set value to treat subsequent program instructions as undefined instructions. These undefined instructions may then trigger an undefined instruction exception or other type of response.

24 Claims, 5 Drawing Sheets

(56) References Cited

U.S. PATENT DOCUMENTS

2009/0070565 A1* 3/2009 Bartlett .................. 712/229
2010/0132053 A1* 5/2010 Chishima ................. 726/30

FOREIGN PATENT DOCUMENTS

| JP | H05-189231 | 7/1993 |
|----|------------|--------|
| JP | 2004-280801 | 10/2004 |
| JP | 2008-90542 | 4/2008 |
| JP | 2008-257735 | 10/2008 |
| JP | 2010-500661 | 1/2010 |

OTHER PUBLICATIONS

Great Britain Search Report for GB1013467.4 dated Oct. 28, 2010.
Japanese Office Action dated Oct. 27, 2014 in JP 2013-523663 and English translation, 21 pages.
A. Suzuki et al, "Development of Virtual Machine Monitor for ARM Architecture" IPSJ SIG Technical Reports, Information Processing Society of Japan, Jun. 15, 2009, vol. 2009-ARC-183, No. 12, pp. 1-8.
"ARM Architecture Reference Manual ARM DDI 0100HJ-00" pp. A2 to 11—A2 to 15, Mar. 2005, ftp.at.netbsd.org.
Chinese Office Action dated Oct. 29, 2014 in CN 201180038092.7 and English translation, 18 pages.

* cited by examiner

ILLEGAL MODE CHANGE HANDLING

This application claims priority to GB Application No. 1013467.4 filed Aug. 11, 2010, the entire contents of which are incorporated herein by reference.

BACKGROUND OF THE INVENTION

1. Field of the Invention

This invention relates to the field of data processing systems. More particularly, this invention relates to data processing systems having multiple modes of operation and the management of changes between those modes.

2. Description of the Prior Art

It is known to provide data processing systems with multiple modes of operation. These modes may, for example, correspond to differing levels of privilege with these different privilege levels having different access rights to the resources of a system. The privilege levels may be hardware privilege levels such that when in a mode with a high privilege the system is able to access regions of the memory address space which are not accessible when operating in a mode with a lower privilege. The modes may also correspond to different exception levels within a system of exception level handling. Examples of such data processing systems having multiple modes of operation are the processors designed by ARM Limited of Cambridge, England.

Within such data processing systems having multiple modes of operation, it arises that some changes of mode are illegal (e.g. should not be permitted). As an example, as a security measure, it should not be possible to execute a software instruction that will change the mode to a higher level of privilege thereby gaining more access to the resources of the system. Such changes are better made by using an exception mechanism whereby exception handling code can deal with the entry into the higher level of privilege and preserve the security of the system. It is known to provide data processing systems with hardware mechanisms which prevent such illegal mode changes. However, the behaviour of the system when such a mode change has been prevented can vary from implementation-to-implementation as well as vary in dependence upon the type of illegal change which has been prevented.

SUMMARY OF THE INVENTION

Viewed from one aspect the present invention provides apparatus for processing data comprising:
processing circuitry responsive to program instructions to perform data processing operations, said processing circuitry having a plurality of modes; and
illegal change detecting circuitry responsive to an attempt to perform an illegal change of mode of said processing circuitry specified by an illegal program instruction:
(i) to suppress said illegal change of mode; and
(ii) to set an illegal change bit to a predetermined value indicative of said illegal program instruction attempting to perform said illegal change; wherein
while said illegal change bit has said predetermined value, said processing circuitry responds to further program instructions as undefined instructions.

The present technique provides a consistent response to the detection of an illegal change of mode which may be uniformly applied and which does not itself introduce significant implementation difficulty by requiring a data dependency to trigger the illegal change response. A data dependency can arise when the mode being changed to is transferred either from memory or from a register which itself might be programmed late in the execution pipeline. Resetting of the illegal change bit to the predetermined value with subsequent program instructions being treated as undefined instructions when the illegal change bit has the predetermined value allows the response to the illegal change to be effectively deferred and dealt with as a response to the now undefined subsequent instructions. This eases the data dependency issue in detecting the illegal mode change.

While the illegal change bit could be stored in many different places within the apparatus, in some embodiments it forms part of a current program status register which stores data defining a current state of the apparatus. The illegal change bit which indicates that instructions should be treated as undefined instructions is properly treated as part of the current state of the system and accordingly appropriately stored within the current program status register.

The illegal program instructions can have a variety of different forms. In one form an explicit change of mode instruction may constitute the illegal program instruction if it specifies a change of mode that is not permitted, e.g. a change to a higher level of privilege. Another form of illegal program instruction would be a return from exception instruction which specifies a new program counter value and a new mode that is not permitted, e.g. a return to a higher level of privilege.

The return from exception instruction can itself have different forms. In one example form the new program counter value and the new mode may be specified in respective registers stored within the system. In another example form of the return from exception instruction the new program counter value and the new mode may be specified in memory.

As previously mentioned, the illegal change of mode can take a variety of different forms. One example is a change to a higher level of privilege. Another example is a change to a mode that contradicts other state data stored within the apparatus indicating what the mode state should be, e.g. a change of mode that indicates a different instruction set is to be used with this contradicting other data stored within the system indicating a different instruction set should be used.

In order that the system can maintain responsiveness to exceptions occurring during operation despite the setting of the illegal change bit, in some embodiments the processing circuitry responds to an exception event to save a current value of the illegal change bit as a saved bit and to set the illegal change bit to a value different from the predetermined value such that exception handling program instructions associated with the exception even that has occurred may be executed. Thus, the treating of subsequent instructions as undefined instructions when the illegal change bit is set may be suppressed upon occurrence of an exception event which saves off the illegal change bit thereby permitting the exception handling program instructions to execute.

In order that the behaviour appropriate to the detection of the illegal mode change is not lost, some embodiments are configured such that upon a return from execution of the exception handling program instructions, the illegal change bit is set to match the saved bit such that the previous occurrence of an illegal mode change receives its proper response.

In order to assist with handling the illegal mode change, some embodiments include a syndrome register configured to store a syndrome value indicative of a type of the illegal program instruction that attempted the legal change of mode. The data within such a syndrome register can be used to trigger an appropriate response to the illegal mode change attempt matching the type of instruction which gave rise to that illegal attempt.

One type of response to the undefined instructions is triggering of an undefined instruction exception event. Mechanisms for responding to undefined instructions are often already present within data processing systems and these can be reused to deal with the effects of an attempt to make an illegal mode change. Such undefined exception handling can be made responsive to the syndrome register such that the undefined exception response can be tailored to the cause of the exception.

As previously mentioned, the plurality of modes between which changes can be made may vary. One example is different levels of privilege having different levels of access to resources of the system. Another example are systems utilising a plurality of different instruction set modes, each corresponding to decoding an execution of program instructions from a different instruction set. There are further examples of different modes of operation between which some changes may be illegal.

Viewed from a further aspect the present invention provides an apparatus for processing data comprising:

processing means for performing data processing operations in response to program instructions, said processing means having a plurality of modes; and illegal change detecting means for detecting an attempt to perform an illegal change of mode of said processing circuitry specified by an illegal program instruction and in response to said attempt:

(i) for suppressing said illegal change of mode; and
(ii) for setting an illegal change bit to a predetermined value indicative of said illegal program instruction attempting to perform said illegal change; wherein while said illegal change bit has said predetermined value, said processing means responds to further program instructions as undefined instructions.

Viewed from a further aspect the present invention provides a method of processing data comprising the steps of:

performing data processing operations in response to program instructions using processing circuitry, said processing circuitry having a plurality of modes;

in response to detecting an attempt to perform an illegal change of mode of said processing circuitry specified by an illegal program instruction:

(i) suppressing said illegal change of mode; and
(ii) setting an illegal change bit to a predetermined value indicative of said illegal program instruction attempting to perform said illegal change; and while said illegal change bit has said predetermined value, responding to further program instructions as undefined instructions.

It will be further appreciated that one implementation of the present techniques may be in the form of a virtual machine comprising a general purpose computer programmed so as to provide an execution environment for program cede which matches the apparatus and methods described above and includes the mechanisms for responding to illegal changes of mode as previously discussed.

The above, and other objects, features and advantages of this invention will be apparent from the following detailed description of illustrative embodiments which is to be read in connection with the accompanying drawings.

DESCRIPTION OF THE EMBODIMENTS

Figure 1:
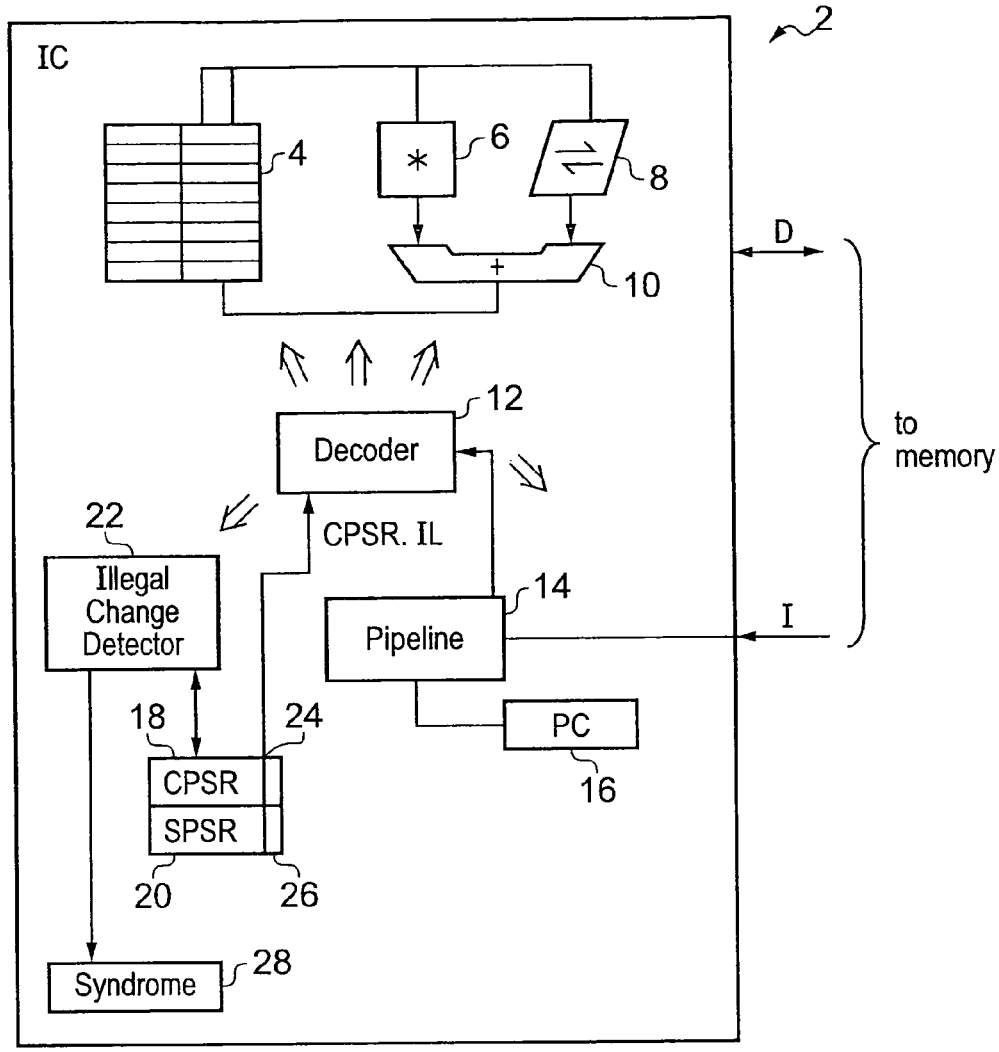
FIG. 1 schematically illustrates a data processing system supporting multiple modes of operation and including an illegal mode change detector.

FIG. 1 schematically illustrates a data processing apparatus 2 in the form of a processor core. The processor core includes a data path including a general purpose register bank 4, a multiplier 6, a shifter 8 and an adder 10. An instruction decoder 12 is responsive to program instructions with an instruction pipeline 14 to generate control signals for controlling the data path 4, 6, 8, 10 as well as other portions of the processor core in accordance with the program instruction being executed. The program instructions are fetched from a memory along an instruction path. Data values to be manipulated by the data path 4, 6, 8, 10 are also fetched from the memory. It will be appreciated that the data processing apparatus 2 will typically contain many further circuit elements and these had been omitted from FIG. 1 for the sake of clarity.

The data processing system 2 further includes a program counter register 16 storing a memory address value corresponding to the memory address of a currently executing program instruction. A current program status register 18 and a saved program status register 20 are also provided storing state variables indicative of a current state of the data processing system 2 as well as a saved state of the data processing system 2 for use when a mode change occurs and it is desired to record the previous state variables. This type of current program status register 18 and saved program status register 20 will be familiar to those in this technical field, such as those familiar with the processors designed by ARM Limited of Cambridge, England.

Also included within the data processing system 2 is illegal change detecting circuitry 22. This illegal change detecting circuitry 22 is coupled to the current program status register 18 and serves to detect illegal changes in the mode of operation of the data processing system 2. As an example, the illegal change detecting circuitry 22 may detect an illegal change corresponding to a switch to a higher level of privilege occurring as a response to execution of a mode changing instruction or an exception return in a manner that is not permitted. Another example of an illegal change which may be detected by the illegal change detecting circuitry 22 is a change to execution of instructions from a different instruction set (the data processing system 2 and the instruction decoder 12 may support multiple different instruction sets) which is contradictory to other state data held within the system indicating what the instruction set in use should be. It will be appreciated that the data defining the current mode of operation is typically stored within the current program status register 18 and accordingly the illegal change detecting circuitry 22 is coupled to the current program status register 18 and may detect these changes at the point at which it is attempted to write the mode change into the current program status register 18. These writes may occur late in the execution of an associated illegal program instruction as these may have data dependencies which control whether or not the change being made is or is not illegal. Accordingly, trying to identify such illegal program instructions when they are decoded is difficult and introduces undesirable microarchitectural constraints on the design of the data processing system 2.

When the illegal change detecting circuitry 22 detects an illegal mode change it sets an illegal change bit 24 within the current program status register 18 to a predetermined value (e.g. sets this illegal change bit CPSR.IL to a value of "1"). If the state variables stored within the current program status register 18 are saved, such as upon taking an exception, then they are saved within the saved program status register 20. This includes saving a copy of the illegal change bit 24 into a corresponding saved illegal change bit 26 within the saved program status register 20.

At the same time as setting the illegal change bit 24 to the predetermined value upon detection of an illegal mode change, the illegal change detecting circuitry 22 also writes into a syndrome register 28 data indicative of the type of illegal program instruction which attempted the illegal change. Thus, the syndrome register 28 may contain data indicative of the illegal program instruction being an illegal mode changing instruction or an illegal exception return instruction of differing types. The data stored within the syndrome register 28 may be analysed during the exception handling associated with the subsequent response to instructions following the illegal instruction being treated as undefined instructions.

When the illegal change bit 24 is set, the instruction decoder is responsive to this bit to treat subsequently received program instructions as undefined instructions. Accordingly, the illegal change bit CPSR.IL is supplied as an input to the instruction decoder 12. The instruction decoder 12 will treat all program instructions received for decoding as undefined instructions while the value of the illegal change bit CPSR.IL it is receiving matches the predetermined value (e.g. is set to a value of 1).

The instruction decoder 12 may respond to an attempt to decode an undefined program instruction (as may be indicated by the illegal exception bit) by triggering an undefined instruction exception to be handled by undefined instruction exception handling code. Such undefined exceptions will be familiar to those in this technical field although these do not normally arise by this mechanism of illegal change detection.

Figure 2:
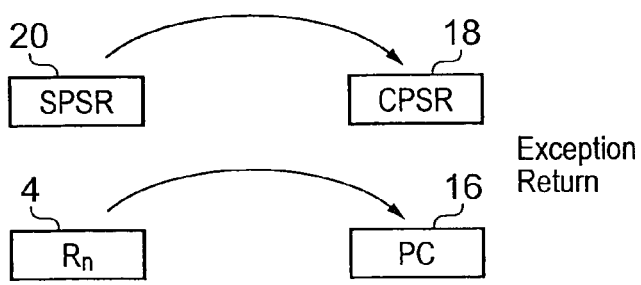
FIG. 2 schematically illustrates one example form of an exception return response.

FIG. 2 illustrates one example of an exception return instruction. In this example, an exception return instruction triggers the storage of a new program counter value into the program counter register 16 from one of the registers of the register bank 4. Similarly, a new mode value is written into the current program status register 18 from the saved program status register 20. A variety of different forms of exception return instruction which trigger the response illustrated in FIG. 2 may be identified by the instruction decoder 12.

Figure 3:
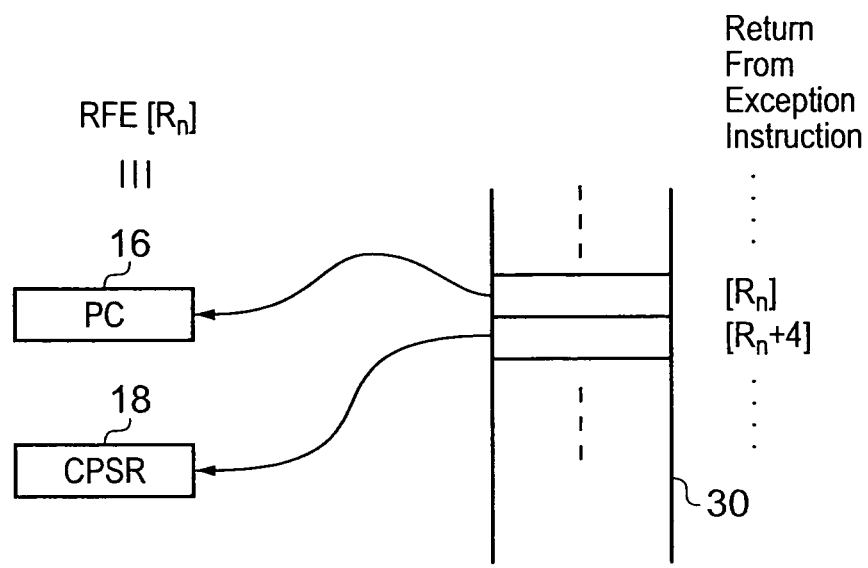
FIG. 3 schematically illustrates another example form of an exception return response.

FIG. 3 illustrates a further example of an exception return instruction. In this example the new program counter value and the new mode value to be stored within the program counter register 16 and the current program status register 18 are read from a memory 30 at a memory address (Rn) specified by a register associated with the return from exception instruction (RFE[Rn]).

Figure 4:
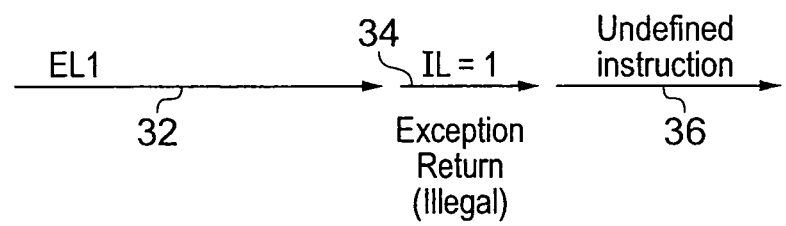
FIG. 4 schematically illustrates detection of an illegal mode change and the response thereto.

FIG. 4 schematically illustrates the occurrence and response to an attempted illegal mode change. As illustrated by the line 32, the system is processing program instructions at an exception level EL1. At point 34 an attempt is made to execute an exception return instruction which is specifying the illegal mode change as previously discussed. This illegal mode change is detected by the illegal change detecting circuitry 22. The illegal change detecting circuitry 22 sets the illegal change bit CPSR.IL to the predetermined value such that CPSR.IL=1. Subsequent instructions executed as indicated at point 36 are treated by the instruction decoder 12 as undefined instructions as the instruction decoder 12 is responsive to the illegal change bit CPSR.IL having the predetermined value.

Figure 5:
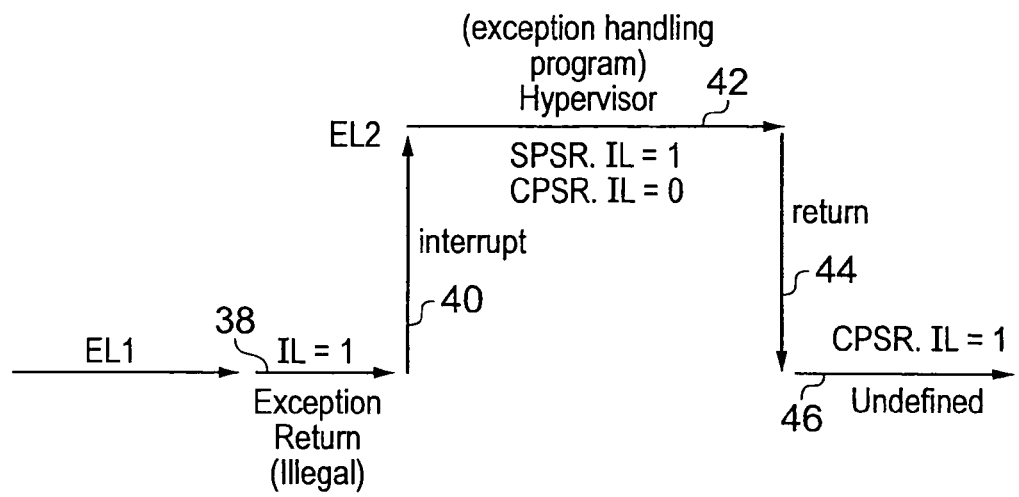
FIG. 5 schematically illustrates detection of an illegal mode change followed by an unrelated interrupt event.

FIG. 5 illustrates a response to an illegal attempted change of mode which is followed by a normal interrupt. The illegal instruction is detected by the illegal change detecting circuitry 22 during the processing 38. The illegal change bit is set to the predetermined value. Immediately following execution of the illegal program instruction, an interrupt 40 arises which causes an exception response including a change to a higher exception level EL2. As part of this exception response, the current program status register 18 has its contents copied to the saved program status register 20 and the illegal change bit 24 within the current program status register 18 is changed to differ from the predetermined value. This has a result that the exception handling program instructions of the hypervisor program executed during the processing 42 are not treated as undefined instructions and can execute normally to handle the interrupt event 40 as expected. On the return from the exception event 44, the content of the saved program status register 20, including the illegal change bit having the predetermined value, is restored into the current program status register 18. Thus, as execution of the original program sequence recommences at processing 46, the program instructions are treated as undefined and may be responded to by triggering of an associated undefined exception response (not illustrated) which will again trigger to a higher level of privilege and cause the illegal change bit to be changed from the predetermined value such that the undefined exception response can execute its code.

Figure 6:
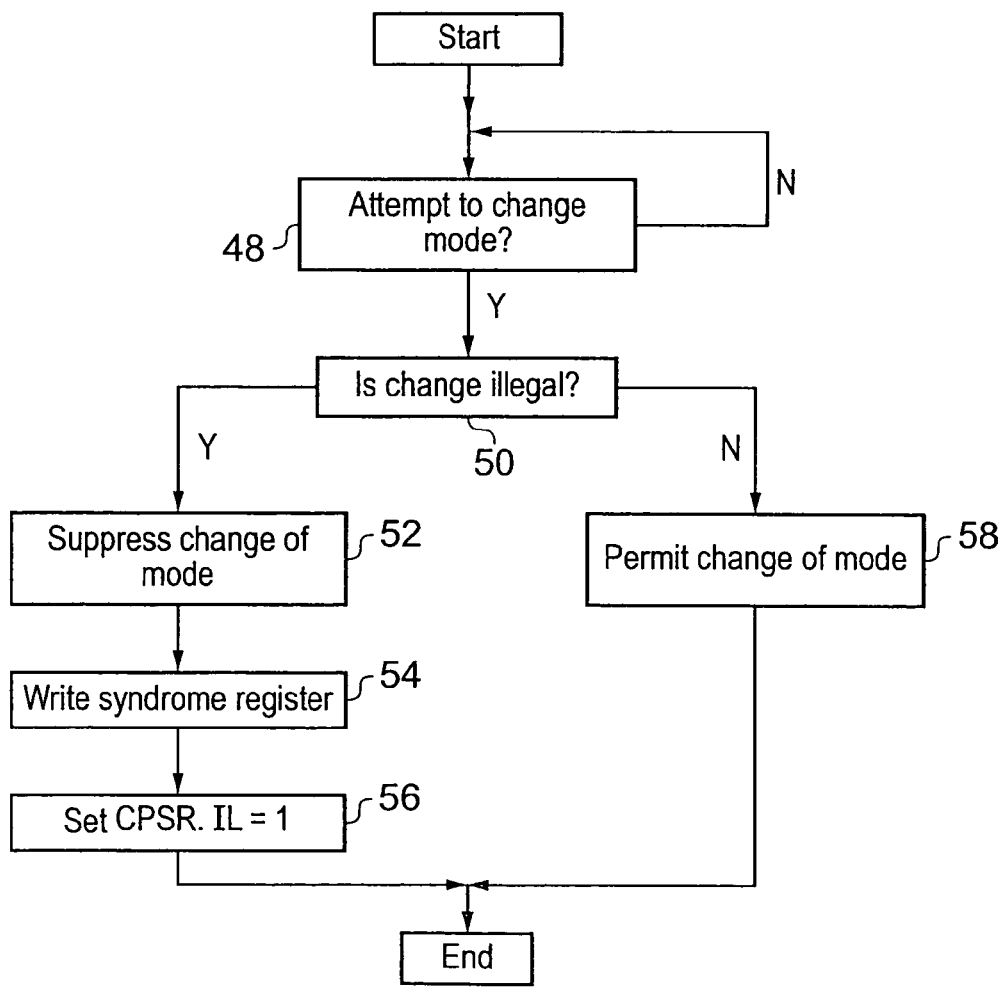
FIG. 6 is a flow diagram schematically illustrating detection of an illegal mode change.

FIG. 6 is a flow diagram illustrating the operation of the illegal change detecting circuitry 22. At step 48 processing waits until there is an attempt to change the mode of operation. Step 50 determines whether or not this change is illegal, i.e. matches predetermined characteristics corresponding to illegal changes. If the change is illegal, then step 52 suppresses that change, step 54 writes a value to the syndrome register 28 indicative of the illegal program instruction that attempted that change and step 56 sets the illegal change bit CPSR.IL to the predetermined value. If the determination at step 50 was that the change is legal, then step 58 permits the change of mode specified by the program instruction concerned.

Figure 7:
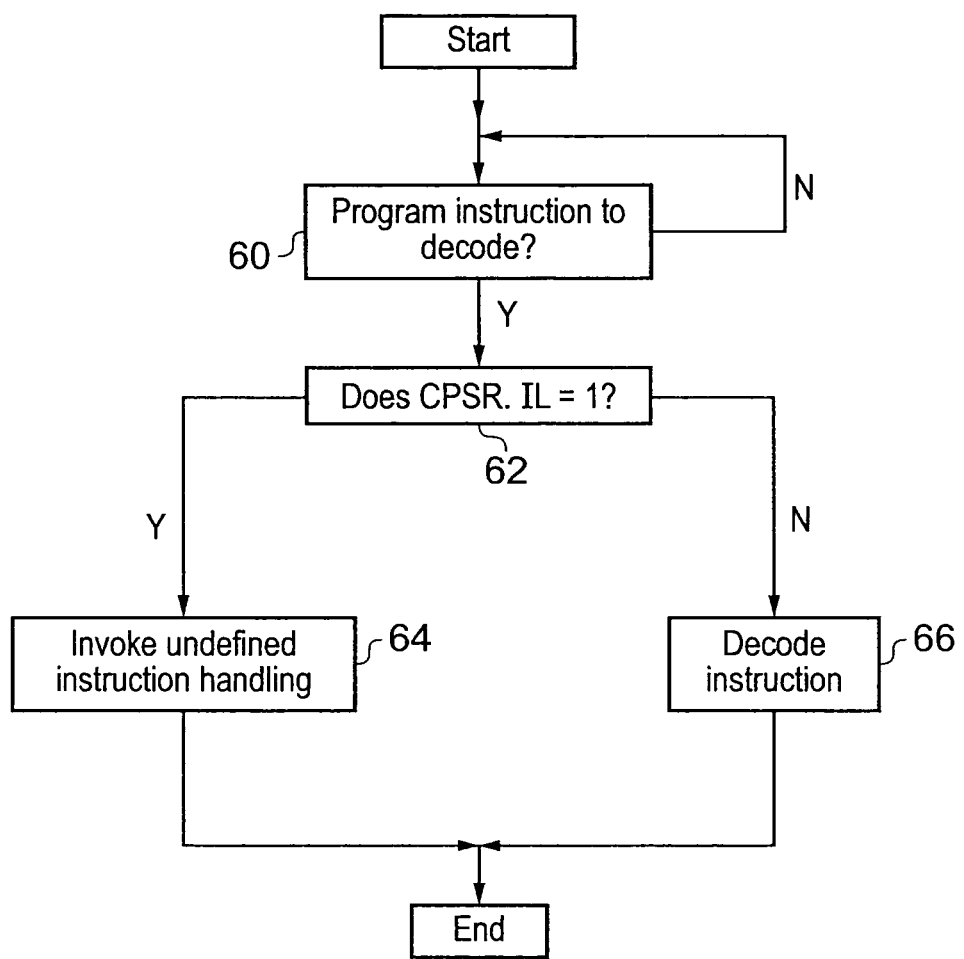
FIG. 7 is a flow diagram schematically illustrating decoding of instructions in dependence upon the illegal change bit.

FIG. 7 is a flow diagram schematically illustrating the operation of the instruction decoder 12. At step 60 the instruction decoder 12 waits for a program instruction to decode. At step 62, a determination is made as to whether or not the illegal change bit CPSR.IL has the predetermined value indicating a previous attempt to make an illegal mode change. If the illegal change bit has the predetermined value, then processing proceeds to step 64 where undefined instruction handling is invoked, e.g. an exception event corresponding to an undefined instruction exception is triggered. If the determination at step 62 is that the illegal change bit is not set, then processing proceeds to step 66 where the instruction is decoded in the normal way. It will be appreciated that the decoding at step 66 could in fact result in a determination that the instruction concerned was an undefined instruction in a manner independent of any previous attempted illegal change of mode, such as the instruction simply being mis-formed.

Figure 8:
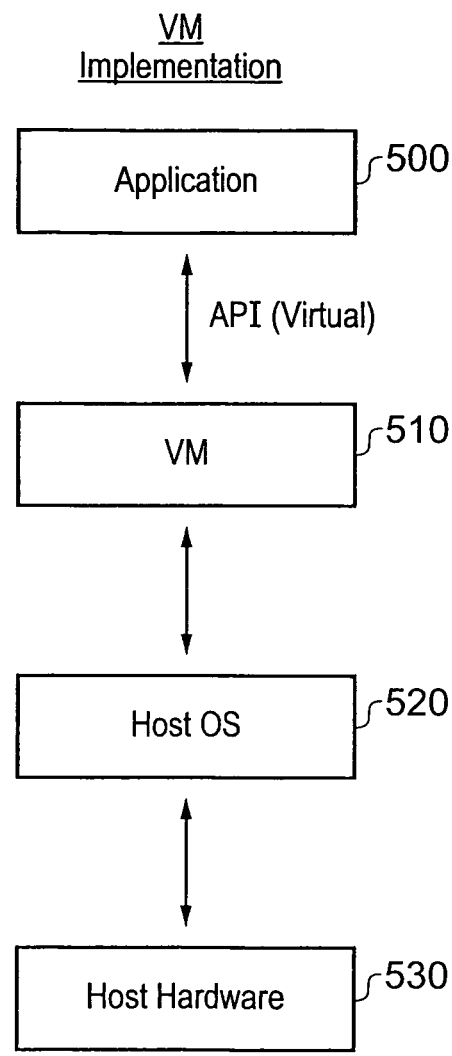
FIG. 8 is a diagram schematically illustrating a virtual machine implementation of the present techniques.

FIG. 8 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus for processing data comprising:
    processing circuitry responsive to program instructions to perform data processing operations, said processing circuitry having a plurality of modes, said plurality of modes include at least one of a plurality of different instruction set modes, each instruction set mode corresponding to decoding and execution of program instructions from a different instruction set; and
    illegal change detecting circuitry responsive to an attempt to perform an illegal change of mode of said processing circuitry specified by an illegal program instruction:
    (i) to suppress said illegal change of mode; and
    (ii) to set an illegal change bit to a predetermined value indicative of said illegal program instruction attempting to perform said illegal change; wherein
    while said illegal change bit has said predetermined value, said processing circuitry responds to further program instructions as undefined instructions.

2. The apparatus as claimed in claim 1, comprising a current program status register configured to store data defining a current state of said apparatus including a current mode of said processing circuitry and said illegal change bit.

3. The apparatus as claimed in claim 1, wherein said illegal program instruction is one of:
    (i) an explicit change of mode instruction specifying a change of mode that is not permitted; and
    (ii) a return from exception instruction that specifies a new program counter value and a new mode that is not permitted.

4. The apparatus as claimed in claim 3, wherein said return from exception instruction retrieves said new program counter value and said new mode from respective registers.

5. The apparatus as claimed in claim 3, wherein said return from exception instruction retrieves said new program counter value and said new mode from a memory.

6. The apparatus as claimed in claim 1, wherein said illegal change of mode is one of:
    (i) a change to a mode with a higher level of privilege; and
    (ii) a change to a mode that contradicts other state data stored by said apparatus indicating what is said mode.

7. The apparatus as claimed in claim 1, wherein said processing circuitry is configured to respond to an exception event to save a current value of said illegal change bit as a saved bit and to set said illegal change bit to a value different from said predetermined value such that exception handling program instructions associated with said exception event are executed.

8. The apparatus as claimed in claim 7, wherein said processing circuitry is configured such that upon a return from execution of said exception handling program instructions said illegal change bit is set to match said saved bit.

9. The apparatus as claimed in claim 1, comprising a syndrome register configured to store a syndrome value indicative of a type of said illegal program instruction that attempted said illegal change of mode.

10. The apparatus as claimed in claim 1, wherein said processing circuitry responds to an attempt to execute an undefined instruction by triggering an undefined instruction exception event.

11. The apparatus as claimed in claim 1, wherein said plurality of modes includes
    a plurality of different levels of privilege having different levels of access to resources of said apparatus.

12. An apparatus for processing data comprising:
    processing means for performing data processing operations in response to program instructions, said processing means having a plurality of modes, said plurality of modes include at least one of a plurality of different instruction set modes, each instruction set mode corresponding to decoding and execution of program instructions from a different instruction set; and
    illegal change detecting means for detecting an attempt to perform an illegal change of mode of said processing means specified by an illegal program instruction and in response to said attempt:
    (i) for suppressing said illegal change of mode; and
    (ii) for setting an illegal change bit to a predetermined value indicative of said illegal program instruction attempting to perform said illegal change; wherein
    while said illegal change bit has said predetermined value, said processing means responds to further program instructions as undefined instructions.

13. A method of processing data comprising the steps of:
    performing data processing operations in response to program instructions using processing circuitry, said processing circuitry having a plurality of modes, said plurality of modes include at least one of a plurality of different instruction set modes, each instruction set mode corresponding to decoding and execution of program instructions from a different instruction set;
    in response to detecting an attempt to perform an illegal change of mode of said processing circuitry specified by an illegal program instruction:
    (i) suppressing said illegal change of mode; and
    (ii) setting an illegal change bit to a predetermined value indicative of said illegal program instruction attempting to perform said illegal change; and
    while said illegal change bit has said predetermined value, responding to further program instructions as undefined instructions.

14. A method as claimed in claim 13, comprising the step of storing in a current program status register data including a current mode of said processing circuitry and said illegal change bit.

15. A method as claimed in claim 13, wherein said illegal program instruction is one of:
   (i) an explicit change of mode instruction specifying a change of mode that is not permitted; and
   (ii) a return from exception instruction that specifies a new program counter value and a new mode that is not permitted.

16. A method as claimed in claim 15, wherein said return from exception instruction retrieves said new program counter value and said new mode from respective registers.

17. A method as claimed in claim 15, wherein said return from exception instruction retrieves said new program counter value and said new mode from a memory.

18. A method as claimed in claim 13, wherein said illegal change of mode is one of:
   (i) a change to a mode with a higher level of privilege; and
   (ii) a change to a mode that contradicts other stored state data indicating what is said mode.

19. A method as claimed in claim 13, comprising in response to an exception event, saving a current value of said illegal change bit as a saved bit and setting said illegal change bit to a value different from said predetermined value such that exception handling program instructions associated with said exception event are executed.

20. A method as claimed in claim 19, wherein upon a return from execution of said exception handling program instructions said illegal change bit is set to match said saved bit.

21. A method as claimed in claim 13, comprising storing within a syndrome register a syndrome value indicative of a type of said illegal program instruction that attempted said illegal change of mode.

22. A method as claimed in claim 13, comprising in response to an attempt to execute an undefined instruction, triggering an undefined instruction exception event.

23. A method as claimed in claim 13, wherein said plurality of modes includes
   a plurality of different levels of privilege having different levels of access to resources.

24. A virtual machine comprising a computer program stored on a non-transitory computer readable storage medium for controlling a computer to perform the method as claimed in claim 13.

\* \* \* \* \*